Feb. 19, 1957 J. J. KRAKORA, JR 2,782,406

PILOT LIGHT SWITCH

Filed Dec. 2, 1953

INVENTOR.

James J. Krakora, Jr.

By Mueller & Aichele

Attys

United States Patent Office 2,782,406

Patented Feb. 19, 1957

2,782,406

PILOT LIGHT SWITCH

James J. Krakora, Jr., Chicago, Ill., assignor to Motorola, Inc., Chicago, Ill., a corporation of Illinois Application December 2, 1953, Serial No. 395,815

2 Claims. (Cl. 340—258)

The present invention relates to pilot lamp systems for television receivers, and the like, and more particularly to an improved system whereby a pilot lamp in a television receiver is energized automatically only during periods when it is actually needed.

It is usual for television programs to be viewed in a room that is dimmed, if not completely darkened, and it is often desirable that the television receiver be tuned to another signal channel or otherwise adjusted, while the room is in such a darkened condition. Because of this the need has long been appreciated for suitable pilot lamps in the television receiver which will enable the operator to see in a dark room, the various control knobs of the receiver and the calibrations on the station selector. It is apparent that such pilot lamps should not remain continuously energized, during a television program, since the resulting light therefrom would detract from the enjoyment of the program.

Co-pending application Serial No. 395,372 filed December 1, 1953, now Patent No. 2,732,545, in the name of Edward B. Passow et al., entitled "Pilot Light Switch," and assigned to the present assignee; discloses a system whereby a pilot lamp in a television receiver is energized whenever the operator grasps the control knobs of the receiver to effect an adjustment thereof, but which is deenergized when the operator removes his hand. Such a system is ideally suited for television receivers, since it provides pilot light only when it is needed. The present invention provides an improved system of general type disclosed in that application, and the system includes an improved circuit means for positively controlling a pilot lamp so that the lamp is energized only when it is desired to make certain adjustments to the television receiver.

It is, accordingly, an object of the present invention to provide an improved system for controlling the energization of a pilot lamp in a television receiver, so that the lamp may be energized only when the actuating or control knobs of the receiver are grasped by an operator.

A feature of the invention is the provision of an improved pilot lamp system for a television receiver, or the like, which includes an energizing circuit that is controlled to illuminate one or more pilot lamps whenever the operator grasps the control knobs of the receiver, and which system utilizes a periodic signal derived, for example, from the horizontal deflection system of the receiver for controlling the energizing circuit.

Another feature of the invention is the provision of such an improved pilot lamp system in which a pilot lamp is energized in response to a control signal derived from the periodic signal referred to above, and in which means is provided that responds to the hand capacity of the operator to apply the control signal to the energizing circuit of the pilot lamp to cause lamp to be energized only when the operator grasps the control knobs of the receiver.

Another feature of the invention is the provision of such an improved pilot lamp system which includes a bridge network between the periodic signal source in the receiver and the energizing circuit for the lamp, the bridge network being normally balanced to cut off the control signal but being subject to the unbalanced when the operator grasps the control knobs of the receiver.

The above and other features of the invention which are believed to be new are set forth with particularity in the appended claims. The invention itself, however, together with further objects and advantages thereof, may best be understood by reference to the following description when taken in conjunction with the accompanying drawing in which:

The invention is intended to be used in a television receiver having a manually operated control knob for effecting a desired adjustment of the receiver, and which also has periodic signal source included in the receiver circuit. The invention includes a circuit means coupled to the source for deriving the periodic signal and for producing a control signal in response thereto. A capacitive element is disposed adjacent the knob and exhibits capacity variations from a selected capacity value in response to the proximity of an extraneous body to the element. Means is provided for coupling the capacitive element to the circuit means so as to control the production of the control signal thereby. A pilot lamp is mounted adjacent the control knob for illuminating that knob, and the system includes an energizing circuit for the pilot lamp including switching means for controlling the energization of the lamp. Finally, means is provided for utilizing the control signal to actuate the switching means.

Figure 1:
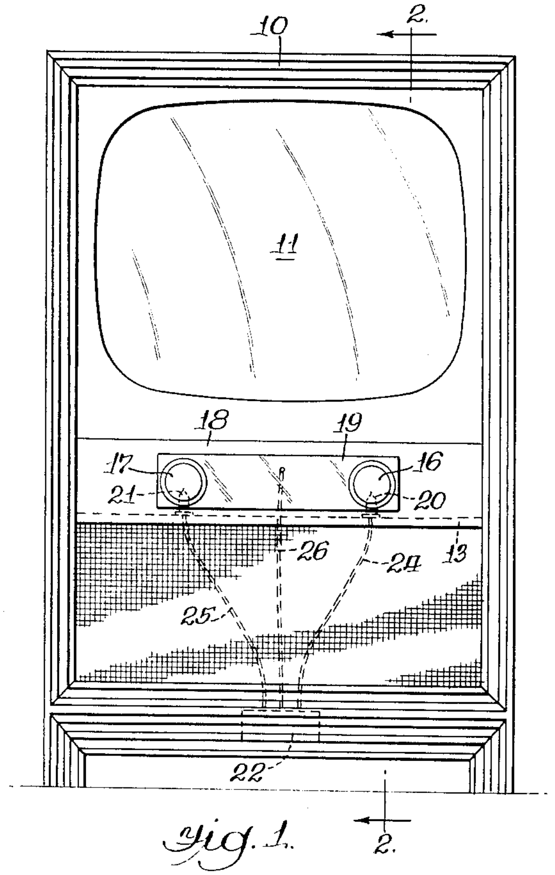
Figure 1 is a front view of a television receiver incorporating a pilot lamp system that may be constructed in accordance with the present invention.
Figure 2:
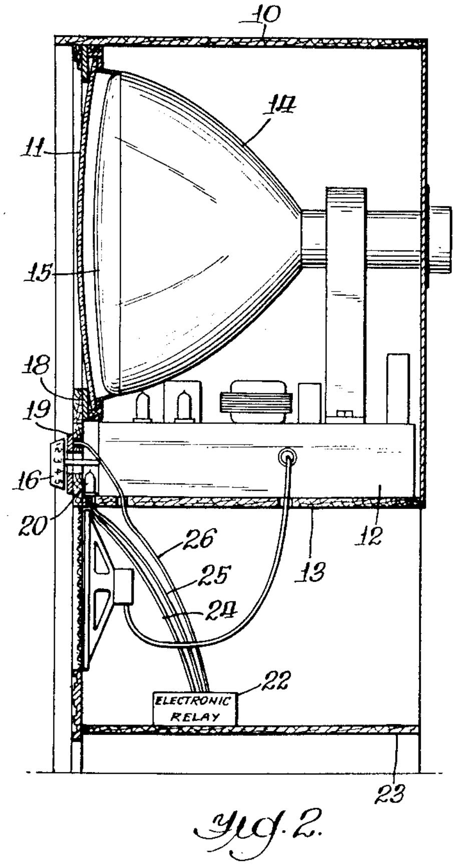
Figure 2 is a side view of the receiver partly in section, taken along the lines 2—2 of Figure 1.

Referring now to the drawing, and in particular to Figures 1 and 2, which show a television receiver including a wooden cabinet 10 and a usual viewing screen 11. A metallic, grounded television chassis 12 is mounted on a wooden shelf 13 within the cabinet, and the chassis includes a cathode-ray image-producing device 14 having a fluorescent screen 15 facing the viewing screen 11 of the receiver. The receiver also includes a pair of control shafts which extend from the chassis 12 through respective enlarged apertures in the front wall or panel 18 of the cabinet, and which also extend through respective enlarged apertures in a metallic escutcheon plate 19 secured to the front wall.

The control shafts have respective actuating or control knobs 16—17 mounted on their respective outer ends, and the arrangement is such that these control shafts are spaced from and out of electrical contact with the metallic escutcheon plate. When so desired, the escutcheon plate need not extend over the control shafts, but may be disposed between the shafts with the shafts extending only through the front wall.

The control knob 16 may, for example, constitute the station selecting dial for the receiver, and this knob is composed of any suitable translucent material with calibrated numerals inscribed thereon corresponding to the various signal channels. Control knob 17, which also may be composed of any suitable translucent material, may be of the dual type and serve to control volume and brightness in accordance with well-known practice.

A pair of pilot lamps 20—21 is mounted on shelf 13 with the lamps being disposed to the rear of panel 18 respectively adjacent the apertures through which the control shafts of knobs 16—17 extend. In this manner the illumination of lamps 20—21 causes the translucent control knobs 16—17 to glow since light from the lamps is transmitted to the knobs through the enlarged apertures in the front panel 18 and in the escutcheon plate 19.

The system also includes an electronic relay unit 22 which includes the energizing and control circuits for the pilot lamps. This unit is mounted on a bottom shelf 23 within cabinet 10. Lamps 20—21 are connected in series and are connected to unit 22 by way of leads 24—25, and metallic escutcheon plate 19 is connected to the unit by a lead 26.

Figure 3:
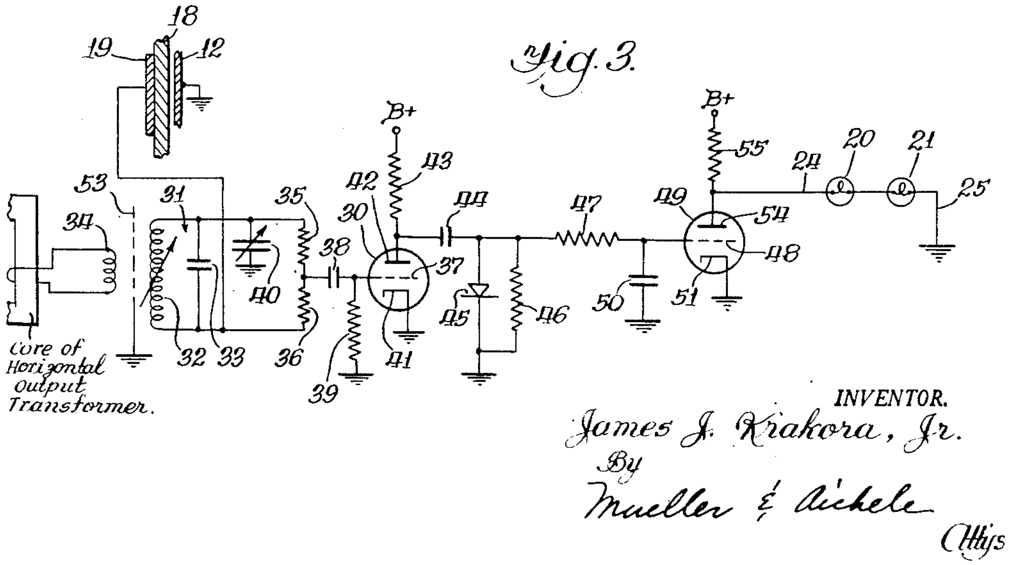
Figure 3 shows one embodiment of the improved pilot lamp system of the present invention.

The control circuit of the present invention is shown in Figure 3 and this control circuit includes an electron discharge device 30 which is connected as an amplifier. The input circuit of the amplifier includes a resonant network 31 which, in turn, includes an inductance coil 32, shunted by a capacitor 33.

Inductance coil 34 is inductively coupled to coil 32, and coil 34 is connected to a periodic signal source within the receiver. A suitable grounded electrostatic shield 53 may be provided between coils 34 and 35. In the illustrated embodiment, this source comprises the output transformer of the horizontal deflection system of the receiver, and the connection is made by a single turn looped around the core of that transmitter, so that coil 34 derives the horizontal periodic retrace pulse signal.

Resonant network 31 is shunted by a pair of series connected resistors 35—36 and the junction of these resistors is coupled to the control electrode 37 of device 30 through a coupling capacitor 38, the control electrode being connected to a point of reference potential or ground through a resistor 39.

The resonant network is also shunted by a variable capacitor 40 connected to ground and by the capacitive element formed by escutcheon plate 19 and its capacitive relation to grounded chassis 12 through the insulating front panel 18 of the cabinet.

Cathode 41 of device 30 is connected to ground, and anode 42 of this device is connected through a resistor 43 to the positive terminal B+ of a source of unidirectional potential. Anode 42 is also coupled through a capacitor 44 to one electrode of a rectifying device 45, the other electrode of this device being connected to ground. Device 45 may be a diode, a selenium rectifier or other suitable semiconductor. Device 45 is shunted by a resistor 46, and the ungrounded end of this resistor is connected through a resistor 47 of the control electrode 48 of an electron discharge device 49, control electrode 48 being coupled to ground through a capacitor 50. Resistor 47 and capacitor 50 form a filter and device 49 functions as a switching means in a manner to be described.

The cathode 51 of device 49 is connected to ground, and the anode 54 of this device is connected to the positive terminal B+ through a resistor 55. Anode 54 is also connected to ground through a series-connected pilot lamps 20—21.

The inductance coil 34 derives the periodic horizontal retrace pulse signal from the horizontal output transformer, and this signal is impressed upon resonant network 31. The resonant network is tuned to the frequency corresponding, for example, to the horizontal retrace pulse signal or any harmonic thereof which provides sufficient amplitude, and the sine-wave signal corresponding to this harmonic is developed across the resonant network. This sine-wave signal is applied across a bridge network which is formed by resistors 35—36, and by capacitor 40 and the capacitive element including plate 19. Resistor 39 forms the diagonal connection for the bridge and, as long as the bridge is balanced, no signal appears across the resistor. Capacitor 40 is adjusted so that the bridge may be balanced when the capacitive element of plate 19 is in its normal condition, that is without any extraneous body being in the vicinity of that plate.

Therefore, under the conditions described above, the bridge is balanced and no signal is applied to amplifier 30 so that no unidirectional potential is developed across resistor 46. Since the control electrode 48 has zero bias thereon, device 49 is highly conductive. The conductivity of device 49 reduces its anode potential to a sufficiently low value so that lamps 20—21 (connected between the anode and ground) are extinguished.

When an operator grasps knobs 16 or 17, his hand capacity varies the capacity of plate 19 and unbalances the bridge network. This allows the sine-wave signal across resonant network 31 to appear across resistor 39 and to be amplified by amplifier 30. The amplified sine-wave signal from the amplifier is rectified by device 45 and appears as a unidirectional negative control potential across resistor 46. This negative control potential biases the control electrode of device 49 in a negative direction and reduces the current flow through the device. The reduction in current flow in device 49 causes its plate potential to rise above the ignition potential of pilot lamps 20—21 and, thereby, causes lamps 20—21 to be energized.

The improved system of the present invention provides, therefore, a positive control for the pilot lamps. Under normal conditions, the capacitive element of escutcheon plate 19 balances the bridge network and, in effect, causes the switching means 49 in the energizing circuit to extinguish the lamps. However, when the hand of an operator, or other extraneous body, approaches plate 19 the bridge is quickly unbalanced so that the sine-wave signal is applied to amplifier 30 wherein it is amplified and applied to the control network of rectifier 45. The latter control network then generates a negative control potential that causes switching means 49 to energize the pilot lamps 20—21. When the operator removes his hand, however, the bridge again becomes balanced, the control potential is cut off, and the lamps are extinguished.

The improved system of the present invention provides, therefore, a positive control for the pilot lamps, so that these lamps are instantaneously illuminated whenever the hand of an operator approaches the escutcheon plate of the receiver, and are immediately extinguished as soon as the operator removes his hand.

While a particular embodiment of the invention has been shown and described, modifications may be made, and it is intended in the appended claims to cover all such modifications as fall within the true spirit and scope of the invention.

I claim:

1. In a television receiver having a manually operated control knob for effecting a desired adjustment of the receiver and including sweep system constituting a source of a periodic signal, the combination of a bridge network having a first arm including a capacitor, a second arm including a capacitive element adjacent the control knob and exhibiting capacity variations from a selected capacity in response to the proximity of the hand of an operator to the control knob, and third and fourth arms each including resistance means, said bridge being balanced only when said capacitive element exhibits said selective capacity; means for deriving an alternating current signal from the periodic signal source and for impressing the alternating current signal across one diagonal of said bridge network; a rectifying circuit connected across the other diagonal of said bridge network and developing a negative unidirectional control potential whenever said bridge is in an unbalanced condition; a discharge device having a control electrode, a cathode and an anode; means connecting said control electrode and cathode across said rectifying circuit to decrease the space current through said device in response to the negative control potential from said rectifying circuit; impedance means connecting said anode to a point of positive direct-current potential; and at least one indicating lamp connected between said anode and said cathode to be illuminated whenever the negative control potential from said rectifying circuit decreases the space current in said device beyond a selected point.

2. In a television receiver having a manually operated control knob for effecting a desired adjustment of the receiver and including a horizontal sweep system constituting a source of a periodic pulse signal, the combination of a resonant network tuned to a frequency harmonically related to the frequency of the pulse signal, means coupling said resonant network to the source to cause said network to develop a sine wave alternating-current control signal thereacross; a bridge network having a first arm including a capacitor, a second arm including a capacitive element adjacent the control knob and exhibiting capacity variations from a selected capacity in response to the proximity of the hand of an operator, and third and fourth arms each including a resistor, said capacitive means and capacitive element and said resistors having selected values such that said bridge is in a balanced condition only when said capacitive element exhibits said selected capacity; means for impressing said alternating-current control signal from the resonant network across one diagonal of said bridge network; a rectifying circuit connected across the other diagonal of said bridge network and developing a negative unidirectional control potential when said bridge is in an unbalanced condition; an electron discharge device having a control electrode, a cathode and an anode; means connecting said control electrode and said cathode across said rectifying circuit to cause said discharge device to be cut-off in response to said negative control potential; resistor means connecting said anode to a point of positive unidirectional potential; and at least one indicating lamp connected between said anode and said cathode to be illuminated whenever said discharge device is cut-off.

References Cited in the file of this patent

UNITED STATES PATENTS

| | | |
|---|---|---|
| 1,870,181 | Mallory | Aug. 2, 1932 |
| 2,333,001 | Goldstine | Oct. 26, 1943 |
| 2,492,388 | Martin | Dec. 27, 1949 |
| 2,560,312 | Tellier | July 10, 1951 |